UNITED STATES PATENT OFFICE.

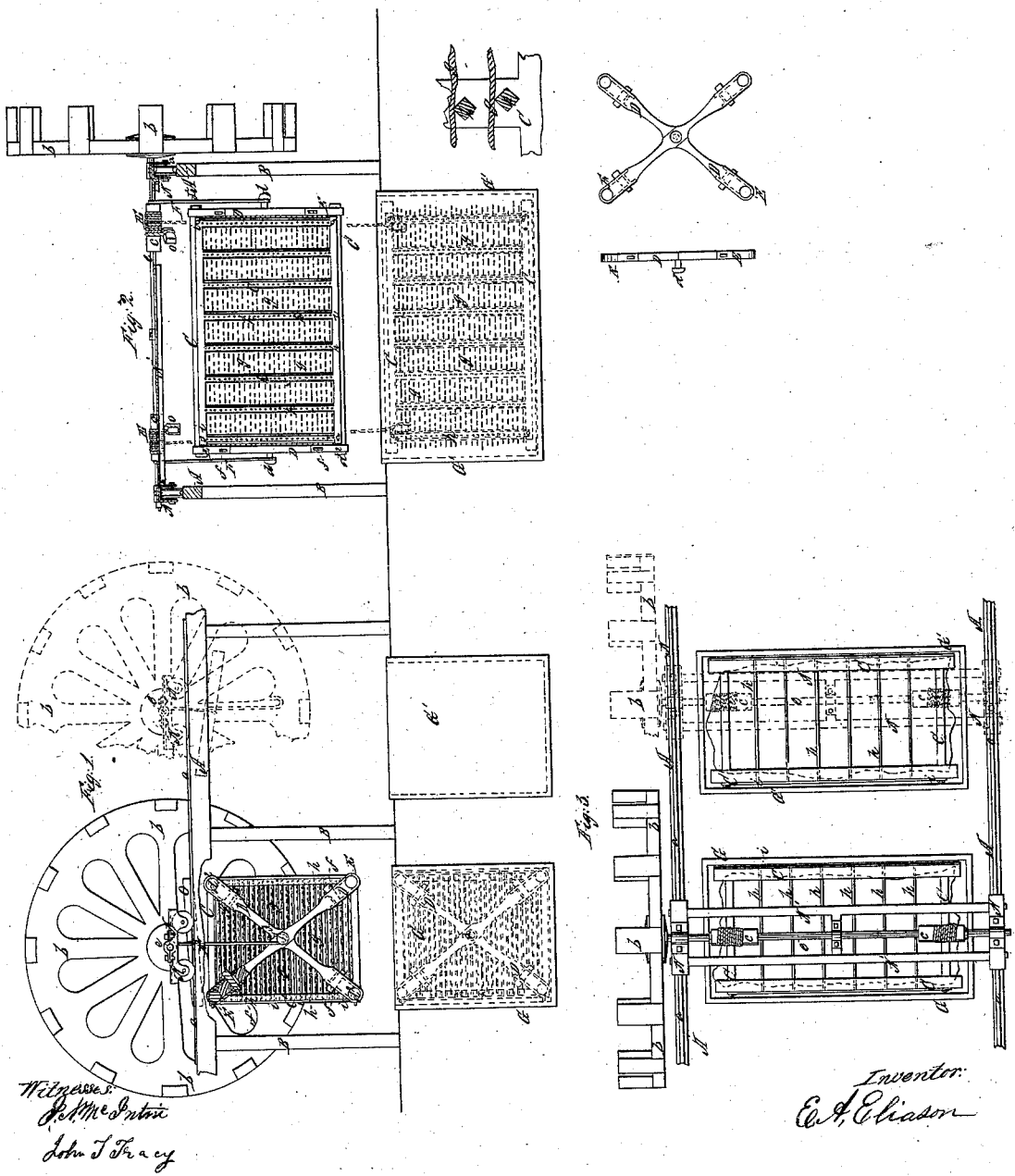

ELIAS A. ELIASON, OF GEORGETOWN, DISTRICT OF COLUMBIA.

CONSTRUCTION OF HIDE-FRAMES IN TAN-VATS.

Specification of Letters Patent No. 15,844, dated October 7, 1856.

*To all whom it may concern:*

Be it known that I, ELIAS A. ELIASON, of Georgetown, in the District of Columbia, have invented a new and useful Improvement in Apparatus for Tanning Leather; and I do hereby declare that the following is a full and exact description thereof, reference being had to the accompanying drawings and to the letters of reference marked thereon.

The nature of my invention consists in the use of a frame or false vat constructed with a series of horizontal ranges of small bars or sticks to place one hide on each and every one of these ranges for the purpose of having each hide remain in a horizontal plane and for keeping each hide separated from the others so that the liquor may surround every hide and be in constant contact with every particle of the surfaces of each and every hide and that the strength of the liquors (which is stirred up when the hides are immersed) may settle in nearly equal quantities on each hide.

To enable others skilled in the art to make and use my invention I will proceed to describe its construction and operation.

I construct my liquor vat in the common box form as represented at (G, G').

(C, C, &c.) represent the frame or false vat with its horizontal ranges of bars (h, h, h, &c.) (the length of the bars and their distance above each other is seen at Fig. 1, their distance apart in the horizontal plane, by their ends, dotted, in Fig. 2).

The yellow lines lettered (g, g, &c.) represent the hides lying on their respective ranges of bars. (Best seen in detail view, marked, "Section through two of the sticks.") The sticks or bars (h, h, &c.) are all placed with their corners or edges in vertical planes so that the hide does not rest upon any extent of surface, nor do the hides even rest upon the edges of the sticks, but when the frame (C) is immersed (with the hides in it) in the liquor in the vat (G) they all rise from the bars on which they rested before immersion and nearly float between the ranges of bars, as they only press against the bars over them in proportion as their specific gravity is less than that of the liquor; it will therefore be readily understood that (after immersion) the bars (h, h, &c.) only serve to keep the hides entirely separated the one from the other thus allowing the liquor to be in constant contact with every portion of the surface of each and every hide. The frame (C C) drawn in red lines in Fig. 2 is merely to show its position in the box or common vat during the tanning process.

(A, A,) represents an elevated rail way with its supports (B, B,) on said rail way is a double truck or carriage, (N, N,) bearing a shaft (e) on which shaft are two drums (c, c) with ropes (E, E,). To the end of each rope is fastened a stick or small beam (O) equal in length to the width of the frame (C, C), the object of having this arrangement being to raise the frame (C) out of or lower it into the liquor or box vat containing the liquor.

(b, b, &c.) is a large tread wheel in which a man or boy walks to raise the frame (C) containing the hides.

(F, F,) are two pendent rods with their ends made into the form of a hook. One end of each rod is hooked around the shaft (e). The other end receives the axle (d) in the cross tree (D) after the frame (C) has been raised to a sufficient height, when said cross tree is fixed on the end of said frame, for the purpose of rotating the said frame (C) or for conveying it to another part of the yard.

Having fully described the construction of my improvement, I will proceed to explain its operation and advantages.

To proceed with the use of my vat I first take off the false side (i) when one end of all the sticks is exposed, I then draw out all the sticks (h, h,) with the exception of the bottom range, on which I place a hide, then insert another range of bars, on which I place another hide, and so proceed until my frame (C) is full of hides, when I run the truck and windlass along, bring it over the frame, raise the frame after having put on the cross trees (D, D,), and drop the axles (d d) in the hooks (F, F), when I run or carry off my frame containing the hides to any desired place and drop said frame into a common vat or box containing the liquor. In this way I fill and deposit a frame to every box or vat requiring one.

When I desire to change the position of hides I raise the frame (in the manner already described) and rotate it on its axes (causing all the liquor to run off of the hides, thus exposing them to examination and the atmosphere) bringing up the side of the hide which was before down and then lower the frame (C) into its box or vat again.

It will be seen that with my improvement I can give the same degree of tanning to each and every portion of a side and to each and every hide and can also regulate at pleasure the time during which the flesh and grain sides shall each catch the strength of the liquor, it being necessary to give different degrees to the flesh and grain sides of the hide.

The advantages of my improvement are too numerous to enumerate here and their existence and greatness proved as I have a large tannery in operation, I would merely state that I can and do tan three times the number of hides in the same time and with little or no more labor than is expended in tanning one third the number.

I am well aware that hides have been immersed in quantities attached to frames or wheels or cords, in a horizontal position and kept out of contact with each other, but in no instance have those several devices been connected to each other in such manner as to form a frame or false vat by which the whole could be simultaneously immersed in or withdrawn from the liquor vat.

It is obvious that the horizontal position of the hide best enables it to receive the strength or tannin of which the tendency is downward and that in that position the strength will penetrate the hide and expel the water whose specific gravity is less, whereas in a vertical or other position the tannin will in a degree pass the pores of the hide.

Having described my improvement what I claim as my invention and desire to secure by Letters Patent is—

1. Arranging a series of ranges of horizontal slats in a false vat or frame upon which the hides are placed, one upon every range whereby the whole may be simultaneously raised out of the liquor vat (without pumping off the liquor) substantially as and for the purposes described.

2. I claim the axial cross trees (D D) when connected with the frame (C) in combination with the hooked rods (F F) and shaft (e) whereby the frame or false vat may be revolved or reversed for the purposes described.

E. A. ELIASON.

Witnesses:
J. N. McIntire,
John T. Tracy.